(12) United States Patent
Stewart

(10) Patent No.: US 11,411,531 B2
(45) Date of Patent: Aug. 9, 2022

(54) CLEANING METHOD FOR SOLAR PANELS

(71) Applicant: PASCO Ventures LLC, Highlands Ranch, CO (US)

(72) Inventor: Paul A. Stewart, Highlands Ranch, CO (US)

(73) Assignee: PASCO Ventures LLC, Highlands Ranch, CO (US)

( * ) Notice: Subject to any disclaimer, the term of this patent is extended or adjusted under 35 U.S.C. 154(b) by 114 days.

(21) Appl. No.: 17/014,588

(22) Filed: Sep. 8, 2020

(65) Prior Publication Data

US 2020/0403563 A1 Dec. 24, 2020

Related U.S. Application Data

(63) Continuation-in-part of application No. 16/386,349, filed on Apr. 17, 2019, now abandoned.

(51) Int. Cl.
*H02S 40/12* (2014.01)
*B08B 6/00* (2006.01)
*B08B 7/00* (2006.01)

(52) U.S. Cl.
CPC .............. *H02S 40/12* (2014.12); *B08B 6/00* (2013.01); *B08B 7/0035* (2013.01)

(58) Field of Classification Search
None
See application file for complete search history.

(56) References Cited

U.S. PATENT DOCUMENTS

| | | | |
|---|---|---|---|
| 6,911,593 B2 | 6/2005 | Mazumder et al. | |
| 8,046,101 B2 | 10/2011 | Hisatani et al. | |
| 8,344,238 B2 | 1/2013 | Gronet et al. | |
| 8,756,739 B1 | 6/2014 | Potter et al. | |
| 8,771,432 B2 | 7/2014 | Meller et al. | |
| 2010/0275968 A1* | 11/2010 | Kaiser | H01L 31/02021 136/244 |
| 2012/0152877 A1 | 6/2012 | Tadayon | |
| 2014/0041713 A1 | 2/2014 | Alder et al. | |
| 2015/0001201 A1 | 1/2015 | Adler et al. | |
| 2015/0047688 A1 | 2/2015 | Gharib et al. | |
| 2015/0114450 A1 | 4/2015 | McKarris | |

(Continued)

OTHER PUBLICATIONS

PCT International Search Report; dated May 22, 2020.
(Continued)

*Primary Examiner* — Mikhail Kornakov
*Assistant Examiner* — Pradhuman Parihar
(74) *Attorney, Agent, or Firm* — Hammer & Associates, P.C.

(57) ABSTRACT

A method for cleaning solar panels when snow, ice, or dust accumulates on the solar panels to reduce or eliminate the electrical power output from the solar panels. The method of cleaning includes selecting specific cleaning locations, on the array of solar panels, based primarily upon obstruction location and obstruction size differences. The method of cleaning also includes the incremental and sequential selection of the cleaning locations, and the incremental and sequential activation of cleaning devices within the selected cleaning locations. Additional groups of incrementally and sequentially activated cleaning devices may be powered, in whole or in part, by the prior solar panels that have been cleaned.

2 Claims, 5 Drawing Sheets

(56) References Cited

U.S. PATENT DOCUMENTS

2018/0175786 A1     6/2018   Iyer
2020/0403563 A1    12/2020   Stewart

OTHER PUBLICATIONS

PCT Written Opinion, dated May 22, 2020.
Corrected Citation—Jaradat et al., A Fully Portable System for Cleaning Solar Panels, IEEE, 2015, retrieved on [Mar. 11, 2021]. Retrieved from the internet <URL: https://ieeexplore.ieee.org/stamp/stamp.jsp?tp=&arnumber=7373479>.
PCT Written Opinion, issued by WIPO dated Dec. 17, 2021, PCT/US2021/048662.
PCT International Search Report, dated Dec. 17, 2021, Intl. App. No. PCT/US2021/048662.
Jaradat et al., A Fully Portable System for Cleaning Solar Panels, IEEE, 2015, retried on [Mar. 11, 2021]. Retried from the internet <URL: https://ieeexplore.ieee.org/stamp/stamp.jsp?tp=&arnumber=7373479>.

* cited by examiner

CLEANING METHOD FOR SOLAR PANELS

CROSS REFERENCE TO RELATED APPLICATION

The present invention is a continuation-in-part of and claims priority to co-pending U.S. application Ser. No. 16/386,349 filed Apr. 17, 2019, which is incorporated by reference herein in its entirety.

TECHNICAL FIELD

The disclosure is directed to photovoltaic or solar panels, and particularly to a method for cleaning the panels.

BACKGROUND

The conversion of sunlight into electricity, i.e., solar power, continues to be a popular source of energy. Solar cell or panel arrays may include a few or thousands of solar cells and panels that are positioned on or near buildings or across large tracts of land, such as deserts. The performance of such solar cell and panel arrays may be diminished substantially because of snow, ice, or dust which decreases the ability of the solar cells to receive sunlight.

If snow, ice, or dust accumulates on the solar cells and panels of an array, the sunlight may be prevented from reaching the solar cells thereby preventing the solar cells from generating power until the snow or ice melts or the dust is removed. In certain regions, there may be several sunny days after snow or ice storms, but the accumulation of snow or ice on the solar cells may be variable or unequal across the array such that the snow or ice does not melt on certain areas of the solar cell array, which prevents those certain areas, or the total array of solar panels, from operating normally.

Certain prior solar cell cleaning methods and apparatus use water to clean the solar panels. This approach is not practical when there is snow/or ice or for solar panels installed in the desert. Other approaches have used electrostatic fields to repel dust or the creation of air-flow over the surface of the solar panels. While these or other prior solar cell cleaning methods and apparatus have been proposed, there still remains a need for an improved method for cleaning solar cells and panels, particularly when snow, ice, or dust accumulates on the array in variable patterns or irregular amounts.

SUMMARY

The present invention relates to a method for cleaning solar panels and reducing power consumption during the cleaning of snow, ice, or dust from solar panels. By using the disclosed method with larger solar panel arrays, the power consumption may be reduced to a relatively small amount that may be provided, in whole or in part, by the cleaned solar panels.

The method of the present invention removes snow, ice, or dust from obstructed solar panels by using either heated cleaning devices; electromagnetic/electrostatic cleaning devices; or combination devices which provide both heating and electromagnetic/electrostatic outputs. Sensors determine when the array of solar panels, or individual sections within the array of solar panels, are obstructed to an unacceptable level, thereby preventing the panels in each array section from generating a normal electrical output.

The location, size, and type of an obstruction are sensed and evaluated for each of the sections of the array of solar panels. One or more sections of the array is then selected, and a cleaning area is selected within the selected section of solar panels. Groups of cleaning devices are selected within the selected cleaning area, and the selected cleaning devices are activated to remove snow, ice, or dust.

In accordance with the method of the present invention, only a portion, i.e., as few as one, of the cleaning devices, within the initially selected cleaning area, are activated after the solar panels in the selected cleaning area have been obstructed by snow, ice, or dust. After the initially selected area has been cleaned, additional cleaning areas are incrementally and sequentially selected, and additional groups of cleaning devices, within the selected cleaning areas, are activated to clean the selected sections of the array.

The method of the present invention includes the steps of: (a) evaluating the sections of the array of solar panels to determine the location, size, and type of the obstruction; (b) selecting one or more sections of the array and selecting a cleaning area(s) within the selected section(s); (c) selecting a group of solar panels within the cleaning area and activating the cleaning devices associated with the selected group of solar panels; and (d) incrementally and sequentially selecting additional sections and cleaning areas, and incrementally and sequentially selecting and activating cleaning devices within the additional cleaning areas.

The method of incrementally and sequentially evaluating, selecting, and activating continues until the entire solar panel array is cleaned. The cleaning devices for the incrementally and sequentially selected sections may be powered by the prior solar panels that have been cleaned. Thus, the electrical power generated by the cleaned solar panels is used, in whole or in part, to power the cleaning devices for the next group of selected solar panels to be cleaned.

The sensors are used to detect information including the location, size, and type of obstruction on the solar panels. This information and other information is evaluated by a controller before selecting the desired first cleaning location and before selecting subsequent cleaning locations. The controller evaluates the collected information for selecting a first section of solar panels to be cleaned and for selecting subsequent sections of solar panels to be cleaned. The selected sections of solar panels may be adjacent to each other or spaced apart from each other. Each cleaning area is selected based, in part, on the electrical output variations between individual sections of the array. The selection of the number and location of the cleaning devices to be activated within the selected cleaning area is dependent, in part, on the location and size of the obstruction within the selected cleaning area.

The evaluation of the location, size, and type of the obstruction is supplemented with information regarding weather conditions, weather forecasts, and temperature.

The method disclosed herein, including the steps of incrementally and sequentially evaluating, selecting, and activating cleaning devices, provides an efficient and less costly technique for obstruction removal as compared to known cleaning methods which have all of the cleaning devices either in an on or an off setting. If, for example, the obstruction only covers portions of the entire array, the method of the present invention provides a technique for only activating, a relatively small number of selected cleaning devices in an incremental and sequential manner that reduces the overall cost of obstruction removal as compared to an array of on/off cleaning devices.

These and other aspects of the present invention will be understood from the following detailed description of the embodiments and appended claims with the drawings.

DETAILED DESCRIPTION

References will now be made to the drawings where embodiments of the method of the present invention are illustrated. It will be apparent to one of ordinary skill in the art that various modifications and variations can be made in the present invention without departing from the scope of the invention. It is intended that the present invention covers such modifications and variations as exist within the scope of the appended claims and their equivalents.

Figure 1:
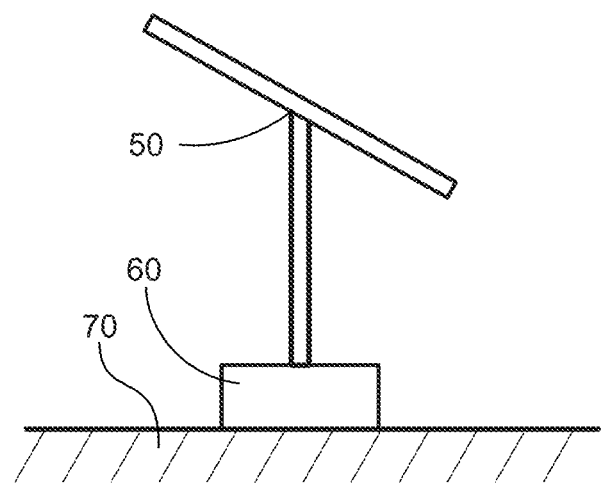
FIG. 1 is a schematic side view of a solar panel.
Figure 2:
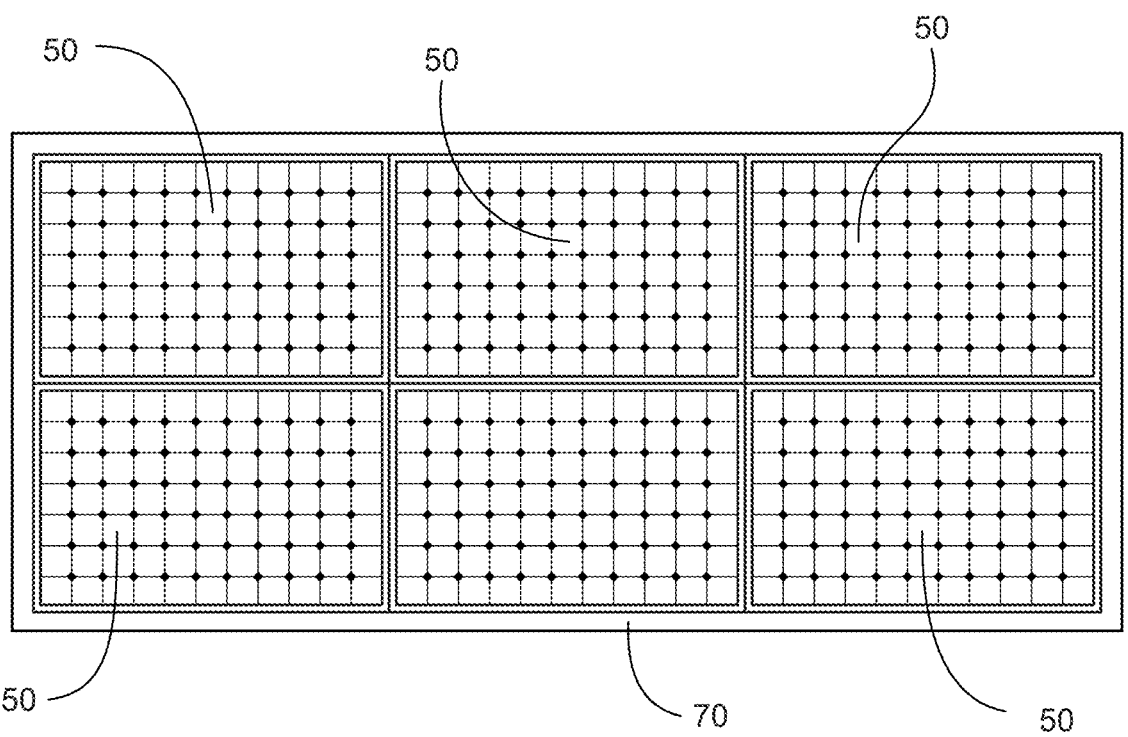
FIG. 2 is a schematic top view of a solar panel group or section.
Figure 3:
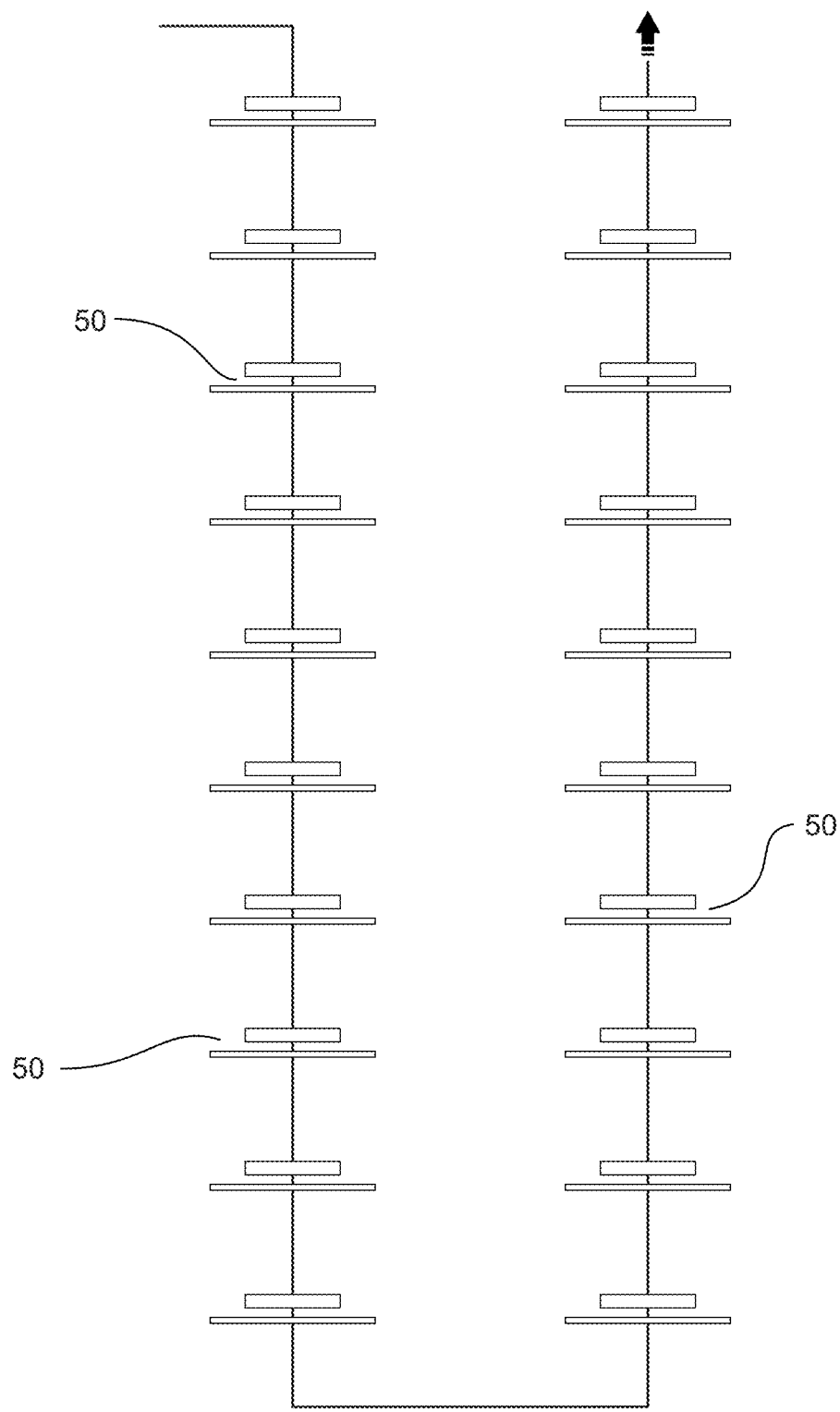
FIG. 3 is a schematic view of a solar panel array.

The present invention provides a method to improve photovoltaic (solar) cell performance. FIGS. 1-3 illustrate a plurality of solar cell panels 50 and a representative panel support structure 60. As is schematically illustrated in FIG. 1, the solar panels 50 are positioned at a desired location on a base 70. The solar cell panels 50 are adjustable such that they may be set at a desired position relative to the sun. Further, as shown in FIG. 2, the solar panels 50 may be arranged in one or more groups or sections wherein the groups or sections may be connected together to make an array of solar panels.

As schematically shown in FIG. 3, the solar panels 50 may be electrically connected in series as a solar panel array. As is conventional, a solar panel array may include a few or even thousands of photovoltaic cells that are positioned near or on buildings or are positioned across large and diverse tracts of land.

It is known that the performance of individual solar panels, groups of solar panels, or solar panel arrays, may be diminished because of snow, ice, or dust, which decreases the ability of the solar cells to receive sunlight. While there have been prior disclosures of cleaning apparatus for solar panels, there remains a need for an improved method for cleaning solar panels while minimizing the amount of power required to operate the cleaning apparatus.

Figure 4:
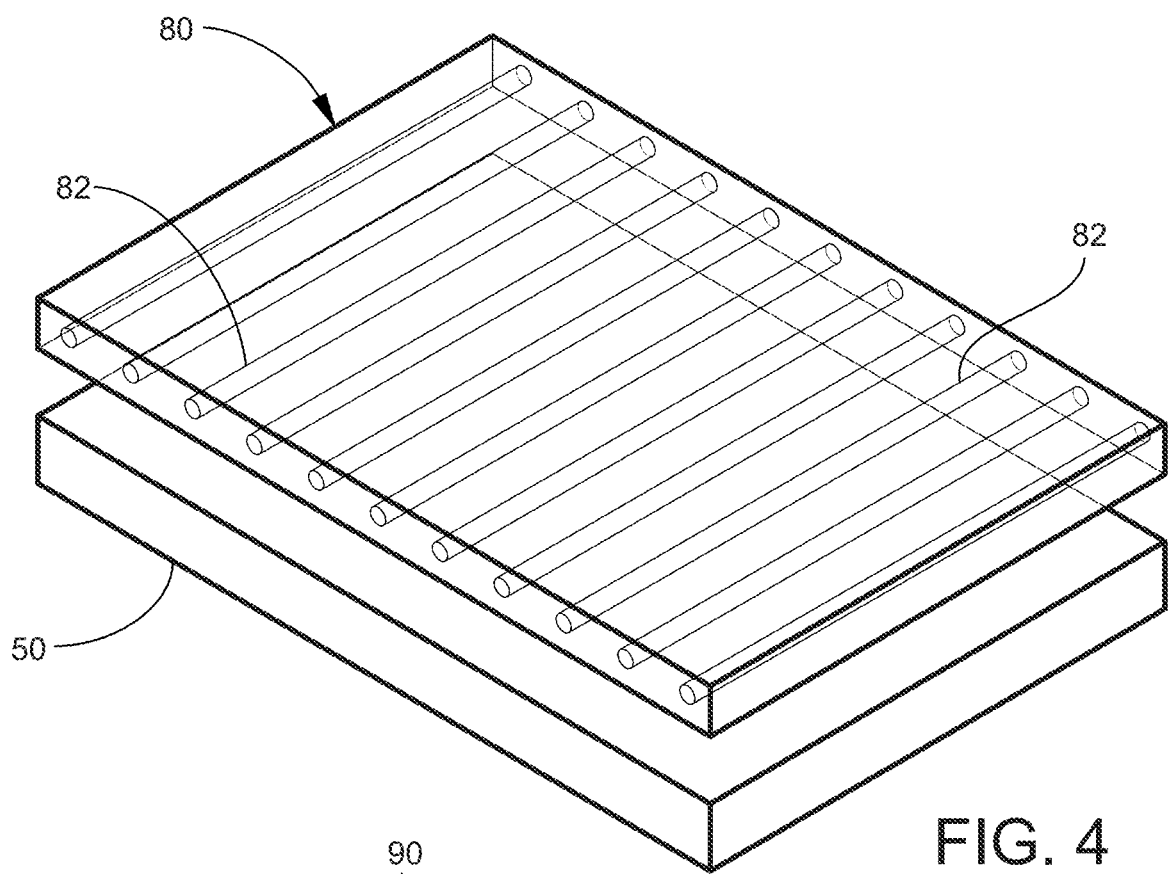
FIG. 4 is a perspective view of a solar panel with a cleaning device.

Referring to FIG. 4, one embodiment of cleaning solar panels is illustrated. In this embodiment, the cleaning device 80 includes a clear panel layer having multi-functional electrodes 82. The electrodes 82 may be constructed to include multiple elements which allow for multiple functional operations. The electrodes 82 may be activated to act as heating elements to melt snow or ice. Alternatively, electrodes 82 may be activated for forming an electrostatic field that repels dust or dirt.

Figure 5:
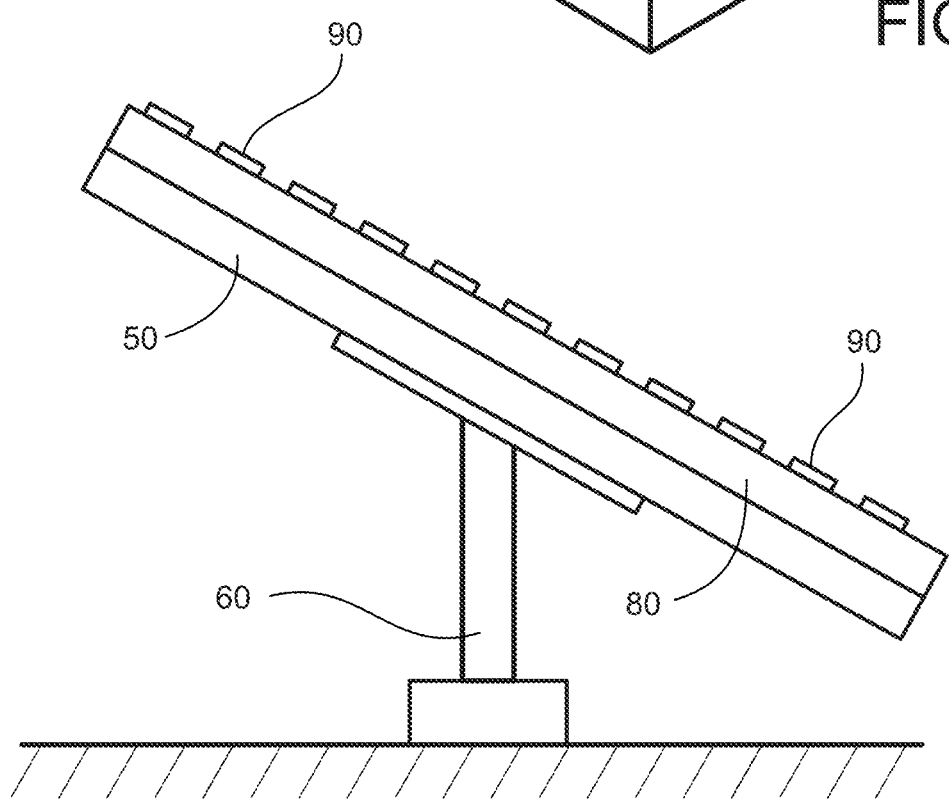
FIG. 5 is a schematic side view of a solar panel with a cleaning device.

FIG. 5 illustrates another embodiment of the self-cleaning device 80. In this embodiment, heating elements 90 are mounted on the surface of device 80 rather than being embedded in device 80. The heating elements 90 are activated to melt snow and ice when the blockage of sunlight due to snow and ice reaches a certain obstruction level. Similarly, when an obstruction of sunlight, due to dust or dirt, reaches a certain level, the electrodes 82 of cleaning device 80 are activated for causing an electromagnetic field across the surface of device 80 for removing the dust or dirt.

Figure 6:
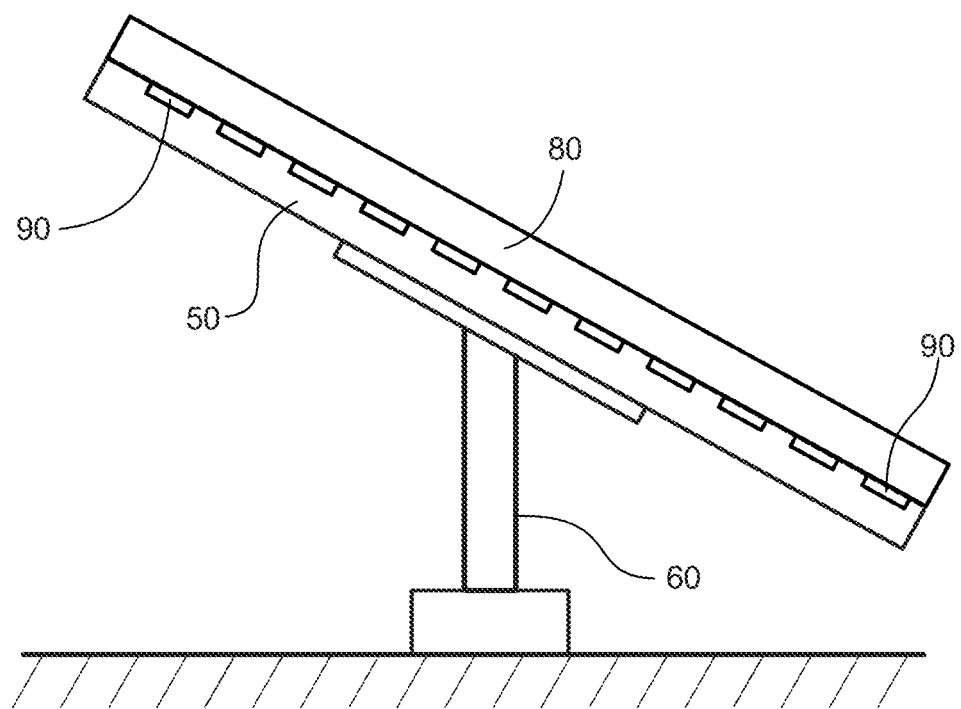
FIG. 6 is a schematic side view of a solar panel with a cleaning device.

Another embodiment of self-cleaning device 80 is illustrated in FIG. 6. In this embodiment, heating elements 90 are mounted between device 80 and solar panel 50. The heating elements 90 are activated to melt snow and ice when a certain obstruction level is reached that is due to snow and ice. Alternatively, an electromagnetic or electrostatic wave is caused by electrodes 82 in device 80 when an unacceptable obstruction level is reached that is due to dust or dirt.

As now more particularly described in connection with FIGS. 7-8, the present invention is related to a method for reducing the power consumption that is required for the cleaning of snow, ice, or dust from solar panels.

Figure 7:
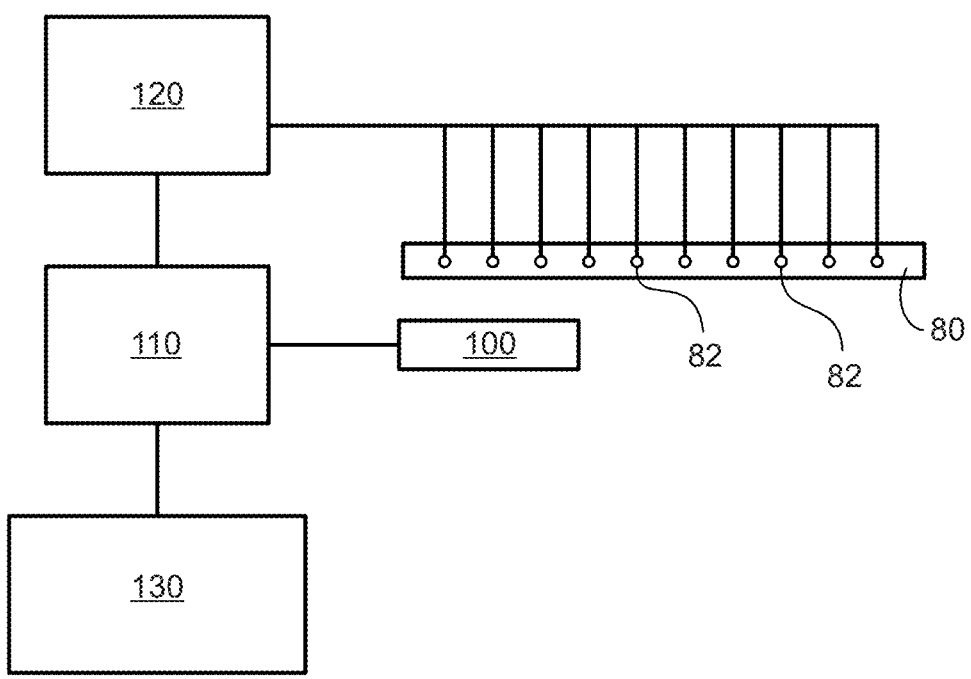
FIG. 7 is a block diagram of a controller connected to alternative cleaning devices.

Referring to FIG. 7, sensors 100 are connected to each solar panel 50 to determine when sections or groups of solar panels are obstructed by snow, ice, or dust, such that the obstruction prevents the sections or groups of solar panels from operating normally, i.e., operating to produce a normal threshold level of electricity.

Figure 8:
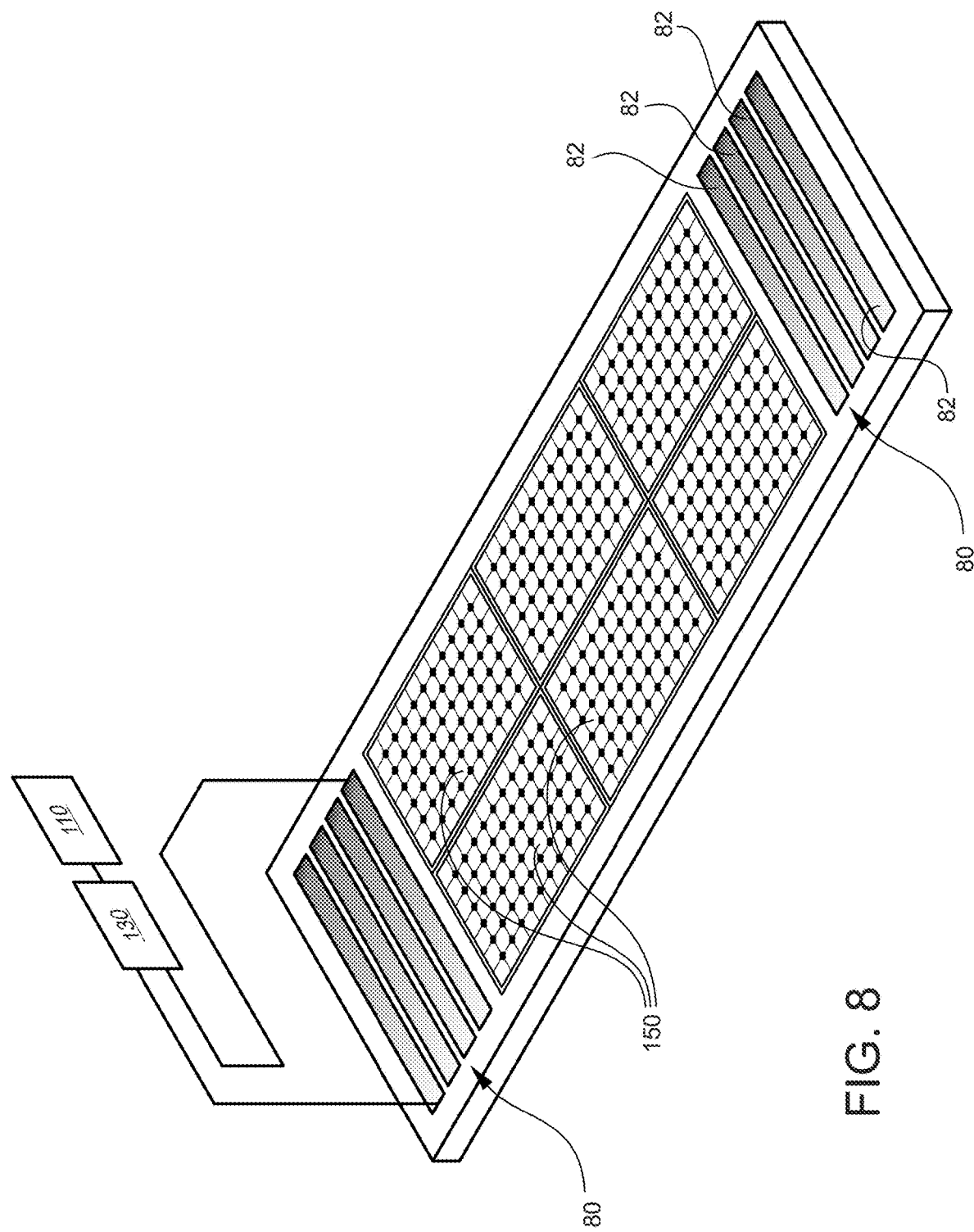
FIG. 8 is a schematic view of an embodiment of cleaning devices associated with a group or section of solar panels.

As shown in FIGS. 2 and 8, the solar panels 50 are arranged in groups or sections in the array of solar panels. An obstruction on the array may be located in variable patterns and locations, with each section of the obstruction having a different density or weight. Further, the obstruction may include sections that are spaced apart with irregular or variable amounts of the obstruction existing on the individual solar panels or sections of the array. Thus, it is not uncommon to have individual sections or individual solar panels of the array that are substantially more affected by the obstruction as compared to other sections of the array.

Sensors 100 detect information, including the obstruction locations, obstruction size differences, and obstruction type. A controller 110 receives the detected information from the sensors 100. Controller 110 also receives other information including weather conditions, weather forecasts, and information relating to the time, date, and temperature. The collection of gathered information is evaluated by the controller 110.

The evaluation of information by the controller 110 begins with the obstruction locations and then the obstruction size differences and obstruction type. The obstruction locations, as used herein, refers to the locations of the regions or sections of the array that have an obstruction, where the obstruction reduces the normal operating output of the regions or sections to a level that is discernably below the normal operating output. Obstruction size differences, as used herein, refers to the weight differences of the obstruction at different regions or sections on the array of solar panels. Obstruction size differences also refers to the electrical output differences at different regions or sections of the obstruction locations. Finally, obstruction type, as used herein, refers to either snow, ice, or dust.

If the collection of information evaluated by controller 110 results in a determination that snow or ice accumulation obstructs some or all of the solar panels 50, controller 110 generates a command signal that is sent to snow and ice controller 130. Controller 130 activates the electrodes 82 or heating elements 90 for one or more of the selected section(s) or region(s) of solar panels 50 for melting the snow or ice obstruction from the selected panels 50.

If the collection of information processed by controller 110 results in a determination that dust or dirt obstructs some or all of the solar panels 50, controller 110 generates a command signal that is sent to controller 120. As shown schematically in FIG. 7, controller 120 provides a multi-phase alternating current signal to electrodes 82 which produces an electromagnetic field for removing the dust or dirt obstruction from the selected section(s) or region(s) of solar panels.

As shown in FIG. 8 and also in FIGS. 4-6, the electrodes 82 or elements 90 may be of any desired shape or size, and they may be located at any desired location relative to the solar panels 50. FIG. 8, for example, shows the electrodes 82 at locations that are spaced from the photovoltaic modules 150.

After the location, size, and type of the obstruction are sensed and evaluated for each of the sections of the array of solar panels 50, one or more sections of the array are selected, based primarily on the gathered information regarding the obstruction location and the obstruction size differences. A cleaning area is then selected within the selected section of the array. The cleaning area is selected based primarily on the information regarding the obstruction location and the obstruction size differences within the selected section. Cleaning devices are selected within the selected cleaning area primarily based upon the obstruction size differences within the selected cleaning area. The selected cleaning devices are then activated to remove snow, ice, or dust. Thus, the present invention provides a method for determining what, when, and where to activate the cleaning devices within each selected section of the array.

In accordance with the method of the present invention, an initial group of obstructed solar panels are selected for cleaning. The cleaning devices (either 82 or 90) for the initial group of solar panels are powered, by stored power, to remove snow, ice, or dust from the selected solar panels. After the initially selected obstructed solar panels are cleaned, the power generated by the cleaned solar panels may be used to power, in whole or in part, the cleaning devices for the next group of obstructed solar panels that are selected for cleaning.

Only a portion, i.e., as few as one, of the cleaning devices, within the initially selected cleaning area, are activated. After the initially selected area has been cleaned, additional cleaning areas are incrementally and sequentially selected, and additional groups of cleaning devices are incrementally and sequentially activated to clean the additional cleaning areas.

New groups or sections of obstructed solar panels are incrementally and sequentially selected and cleaned, after the initially selected group of obstructed solar panels is cleaned. As described, the subsequently selected groups or sections of obstructed solar panels may be cleaned, in whole or in part, by the power that is generated from the previously cleaned groups of solar panels.

As used herein, the method step, which includes: incrementally selecting obstructed solar panels and incrementally activating cleaning devices for cleaning the selected solar panels, means: consecutively increasing or adding to the number of cleaned solar panels by using a step-by-step method for selecting the obstructed solar panels and for activating the cleaning devices associated with the selected solar panels. Further, as used herein, the method step, which includes: sequentially selecting obstructed solar panels and sequentially activating cleaning devices for cleaning the selected solar panels, means: selecting and cleaning the obstructed solar panels in a logical order based upon the obstruction location and the obstruction size.

A purpose for selecting cleaning locations, as described herein, is to make the cleaning procedure more efficient. If, for example, the obstruction is diverse and covers spaced apart portions of the entire array of solar panels, it is more efficient to activate cleaning devices at the locations that are most obstructed rather than activating all of the cleaning devices at the same time. For this example, the obstruction location, as defined herein, would be the primary factor for determining the initial and subsequent cleaning locations on the array.

Alternatively, if the obstruction covers most or all of the solar panel array, the cleaning location may be the entire solar panel array. In this example, the selection of the cleaning areas, based upon obstruction size differences, as defined herein, would be the primary factor in determining the initial and subsequent cleaning areas.

The method of the present invention includes the steps of: (a) evaluating all of the sections of the array of solar panels to determine, as defined herein, the location, size, and type of the obstruction; (b) selecting one or more sections of the array based primarily upon information including the obstruction location and the obstruction size differences; (c) selecting a desired cleaning area within the selected array section based upon information including the obstruction location and the obstruction size differences within the selected array section; (d) selecting and activating cleaning devices within the selected cleaning area based upon the obstruction size differences within the selected cleaning area; (e) incrementally and sequentially selecting additional array sections and cleaning areas, and incrementally and sequentially selecting and activating cleaning devices within the additionally selected cleaning areas; and (f) generating power with the cleaned solar panels that is used, in whole or in part, to power the cleaning devices for the next group(s) of selected solar panels.

As described herein, the method of incrementally and sequentially evaluating, selecting, and activating continues until the entire solar panel array is cleaned. The selected sections of solar panels may be adjacent to each other or spaced apart from each other. Each cleaning area is selected based upon factors including the electrical output variations of individual sections of the array. The selection of the number and location of the cleaning devices to be activated, within the selected cleaning area, is based on factors including the obstruction size differences within the selected cleaning area.

The method disclosed herein, including the steps of incrementally and sequentially evaluating, selecting, and activating cleaning devices, provides an efficient and less costly method for obstruction removal as compared to known cleaning methods where all of the cleaning devices are either turned on or turned off. The method steps of the present invention provide a cleaning process that selects specific to-be-cleaned sections on the array, and then selects and activates a relatively small number of cleaning devices in an incremental and sequential manner for cleaning selected obstructed sections of a solar panel array.

The method of the present invention reduces the overall cost of obstruction removal, as compared to an array of solar panels where each solar panel has a cleaning device, and all of the cleaning devices of the array are either turned on or turned off. Further, the present method does not require a cleaning device for each solar cell or solar panel. The disclosed method allows for various positioning arrangements of the cleaning devices into spaced apart patterns or other positioning arrangements which do not require a cleaning device for each of the solar cells or solar panels.

The present invention may be embodied in other forms without departing from the spirit and the attributes hereof, and, accordingly, reference should be made to the appended claims, rather than to the foregoing specification, as indicative of the scope of the invention.

What is claimed is:

1. A method of cleaning an obstruction from operating surfaces of an array of solar panels that produces a normal threshold level of electricity output, the method comprising:

arranging the solar panels of the array into sections of solar panels, and providing certain sections of solar panels with a clearing device for removing an obstruction from those sections of solar panels;

sensing the existence of an obstruction on all or a part of the operating surfaces of the array of solar panels;

determining when the obstruction reduces the electricity output of the array, or sections of the array, to a level that is below the normal threshold level;

sensing and evaluating the sections of solar panels to determine the obstruction locations, obstruction size differences, and obstruction type;

selecting one or more cleaning sections of solar panels that are adjacent to each other or that are spaced apart from each other, and selecting the one or more cleaning sections based primarily upon the obstruction locations and the obstruction size differences within the array of solar panels;

selecting a desired cleaning area within a selected cleaning section based primarily upon the obstruction locations and the obstruction size differences within the selected cleaning section;

selecting and activating a cleaning device al a selected cleaning location within the desired cleaning area, based primarily upon the obstruction size differences within the desired cleaning area;

incrementally and sequentially selecting additional sections of the array and incrementally and sequentially selecting additional cleaning areas and cleaning locations within the cleaning areas;

incrementally and sequentially selecting and activating cleaning devices within the additionally selected cleaning areas and cleaning locations; and generating electrical power, with cleaned solar panels, to power, in whole or in part, cleaning devices for the incrementally and sequentially selected solar panels that require cleaning.

2. The method of cleaning an obstruction from an array of solar panels according to claim 1 further comprising evaluating information regarding weather conditions, weather forecasts, date, time, and temperature.

* * * * *